United States Patent
Fujio (10) Patent No.: US 10,562,716 B2
(45) Date of Patent: Feb. 18, 2020

(54) CONVEYOR APPARATUS

(71) Applicant: DAIFUKU CO., LTD., Osaka-shi, Osaka (JP)

(72) Inventor: Yoshihiko Fujio, Shiga (JP)

(73) Assignee: DAIFUKU CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 16/077,599

(22) PCT Filed: Feb. 13, 2017

(86) PCT No.: PCT/JP2017/005091
§ 371 (c)(1),
(2) Date: Aug. 13, 2018

(87) PCT Pub. No.: WO2017/141862
PCT Pub. Date: Aug. 24, 2017

(65) Prior Publication Data
US 2019/0047795 A1   Feb. 14, 2019

(30) Foreign Application Priority Data

Feb. 19, 2016 (JP) ................................. 2016-029437

(51) Int. Cl.
B65G 47/38 (2006.01)
B65G 17/32 (2006.01)
B65G 47/96 (2006.01)

(52) U.S. Cl.
CPC ............. *B65G 47/38* (2013.01); *B65G 17/32* (2013.01); *B65G 47/962* (2013.01)

(58) Field of Classification Search
CPC ....... B65G 47/38; B65G 47/40; B65G 47/962

USPC ..................................................... 198/370.04
See application file for complete search history.

(56) References Cited

U.S. PATENT DOCUMENTS

| 6,135,262 | A  | * | 10/2000 | Polling | B65G 47/962 |
| | | | | | 198/370.04 |
| 6,152,280 | A  | * | 11/2000 | Bruun | B65G 17/065 |
| | | | | | 198/370.04 |
| 6,360,868 | B1 | | 3/2002 | Arlt et al. | |
| 6,607,066 | B1 | * | 8/2003 | Andersen | B65G 17/345 |
| | | | | | 198/370.04 |
| 9,902,569 | B2 | * | 2/2018 | Lykkegaard | B65G 47/962 |
| 10,202,245 | B1 | * | 2/2019 | Fujio | B65G 17/345 |

(Continued)

FOREIGN PATENT DOCUMENTS

| CN | 101181957 A | 5/2008 |
| EP | 1447359 A2 | 8/2004 |

(Continued)

OTHER PUBLICATIONS

International Search Report from corresponding International Patent Application No. PCT/JP17/05091, dated May 9, 2017.

(Continued)

*Primary Examiner* — William R Harp
(74) *Attorney, Agent, or Firm* — Kusner & Jaffe (57) ABSTRACT

A conveyor apparatus that conveys articles supported by a plurality of arranged article supports. The conveyor apparatus including infilling members, being disposed between the article supports. In one embodiment, an infill plate serving as the infilling member is urged to a tray by springs, so that the infill plate is kept in contact with the tray.

6 Claims, 5 Drawing Sheets

(56) References Cited

U.S. PATENT DOCUMENTS

| | | | |
|---|---|---|---|
| 10,294,033 B2 * | 5/2019 | Fujio | ............... B65G 17/32 |
| 2008/0138186 A1 | 6/2008 | Yoshida et al. | |
| 2016/0257501 A1 | 9/2016 | Chierego et al. | |

FOREIGN PATENT DOCUMENTS

| | | |
|---|---|---|
| EP | 1602604 A1 | 12/2005 |
| JP | 63-175612 | 11/1988 |
| JP | 2000-16553 | 1/2000 |
| JP | 2002-520239 | 7/2002 |
| WO | WO 00/02802 | 1/2000 |
| WO | WO 2015/052144 A1 | 4/2015 |

OTHER PUBLICATIONS

Chinese Office Action issued in connection with corresponding Chinese Patent Application No. 201780008605.7, dated Nov. 8, 2019.
Extended European Search Report issued in connection with corresponding European Patent 17753119.1, dated Sep. 9, 2019.

\* cited by examiner

CONVEYOR APPARATUS

FIELD OF THE INVENTION

The present invention relates to a conveyor apparatus for transporting articles, and particularly relates to a conveyor apparatus for transporting articles placed on article supports such as a tray.

BACKGROUND OF THE INVENTION

Conveyor apparatuses are used in some facilities where a plurality of articles need to be conveyed from an origin to destinations, for example, in the case of an airport where passenger's baggage is conveyed from an airport check-in area to an area for loading the baggage into an airplane that is scheduled to board passengers. Such a conveyor apparatus conveys articles on trays (article supports) traveling on a conveying path and inclines the trays at positions for the placed articles (inclines the trays laterally with respect to the conveying direction), so that the articles are discharged into chutes disposed along the conveying path and connected to the destinations.

In such a conveyor apparatus, a clearance is left between the adjacent article supports, that is, between the trays, so that part (e.g., the shoulder strap of a bag) of baggage (article) may be dropped or caught in the clearance. In order to solve the problem, as described in WO00/02802 ("Patent Literature 1"), a cover member for covering a clearance (gap) may be prepared.

A cover member described in Patent Literature 1 is directly connected to the bottom of an article support member (tray) via a pivot or a pin and thus the cover member is inclined with the article support member being inclined.

Technical Problem

However, the cover member described in Patent Literature 1 is directly connected to the article support member, precluding an adjustment to a distance between the article support member and the cover member in the vertical direction. Thus, even if the article support member and the cover member are vertically in contact with each other during traveling on a linear part of a conveying path, the inclination of the article support member may vary distances from the article support member between the right and left sides of the cover member.

For example, when the article support member inclines to the right with respect to the conveying direction, the right side of the article support member moves close to the cover member disposed under the article support member, thereby leaving no clearance between the article support member and the cover member. However, the left side of the article support member moves away from the cover member and thus may leave a clearance between the article support member and the cover member. When the article support member is inclined during traveling on a curve, in particular, a clearance between the cover member and the article support member may be extended by a centrifugal force. Moreover, a clearance between the cover member and the article support member may catch part of the baggage (article).

SUMMARY OF THE INVENTION

An object of the present invention is to prevent the formation of a clearance between an infilling member and an article support by encouraging the infilling member to follow a movement of the article support, the infilling member filling a gap between the article supports arranged on a conveying path.

In order to solve the problem, a conveyor apparatus according to an embodiment of the present invention is a conveyor apparatus for conveying articles, including: a plurality of traveling units that travel in series along a conveying path for the articles; and a plurality of article supports that have article support surfaces for supporting the articles and that are caused to travel on the conveying path by the respective traveling units, the conveyor apparatus including infilling members provided for the respective article supports, the infilling member filling a clearance between the article supports longitudinally adjacent to each other in the conveying path, the infilling member being urged to the corresponding article support so as to be kept in contact with the article support.

With this configuration, the infilling member is always urged to the article support regardless of the orientation and the traveling status of the article support.

In addition to the configuration, the conveyor apparatus according to the embodiment of the present invention may include restoring force members provided for the respective infilling members so as to generate a restoring force according to a displacement from a state of equilibrium, in which the infilling member may be urged from below of the article support by the restoring force generated by the restoring force member.

With this configuration, the infilling member can be urged to the article support regardless of the material of the infilling member. Furthermore, even if an article is placed on the infilling member, the infilling member urged from below can support the weight of the article.

In addition to the configuration, the conveyor apparatus according to the embodiment of the present invention may be configured such that a plurality of restoring force members are provided for each of the infilling members, and at least two of the plurality of restoring force members may be disposed at separate positions in a direction crossing the conveying path.

With this configuration, urging at two or more positions can evenly apply an urging force to the overall infilling member. This can prevent the infilling member from being unevenly twisted by applying an uneven urging force (particularly in the width direction crossing the conveying direction).

In addition to the configuration, the conveyor apparatus according to the embodiment of the present invention may be configured such that the infilling member is made of an elastic material, and the infilling member may be urged to the article support by the elasticity of the infilling member.

With this configuration, the infilling member can be urged without a restoring force member. Thus, the number of components of the conveyor apparatus can be reduced and the process of assembly can be simplified.

In addition to the configuration, the conveyor apparatus according to the embodiment of the present invention may be configured such that the infilling member may be supported by the traveling unit that causes the article support to travel next to the corresponding article support of the infilling member in the conveying path.

With this configuration, the infilling member is not supported by the traveling unit of the article support corresponding to the infilling member but is supported by the traveling unit of the article support adjacent to the corresponding article support. Thus, for a specific article support, a clearance between the article support and the adjacent article support is covered with the infilling member supported by the adjacent article support. Thus, if the adjacent article supports are placed in different traveling statuses, the infilling member is not separated from the adjacent article support, for example, during traveling on a curve, thereby securely filling a clearance between the article supports regardless of the traveling statuses of the article supports.

In addition to the configuration, the conveyor apparatus according to the embodiment of the present invention may be configured such that each of the traveling units includes an inclining unit capable of inclining the article support surface in the lateral direction of the conveying path from a horizontal plane by inclining, around a support inclination axis extending along the conveying path, the article support caused to travel by the traveling unit, and the infilling member supported by the traveling unit may be pivotally supported so as to freely incline around an infilling member inclination axis extending coaxially with the support inclination axis.

With this configuration, the central axes of inclination of the article support and the infilling member are coaxial with each other. Thus, when the article support inclines, the corresponding infilling member can incline along the same path as the article support so as to sufficiently follow the inclination of the article support.

In addition to the configuration, the conveyor apparatus according to the embodiment of the present invention may include a vertical swinging shaft attached to each infilling member, extending in a direction that crosses a conveying direction, and the infilling member may be capable of vertically swinging around the vertical swinging shaft.

With this configuration, if the conveying path of the article support includes a vertical movement (uphill and downhill), the infilling member vertically swings according to the vertical movement of the article support so as to follow the vertical movement of the article support. This can prevent a clearance from being left between the infilling member and the article support even during a vertical movement.

According to an embodiment of the conveyor apparatus of the present invention, even if the orientation of the article support changes, the orientation of the infilling member also changes according to the change of the article support. The infilling member is kept in contact with the article support regardless of the orientation and the traveling status of the article support. This prevents a part of an article from falling into a clearance between the article supports over the conveying path and prevents the article support from being caught in the clearance even when the article support inclines.

BRIEF DESCRIPTION OF DRAWINGS BRIEF DESCRIPTION OF THE DRAWINGS

DESCRIPTION OF THE EMBODIMENT

Schematic Structure of a Conveyor Apparatus

Figure 1:
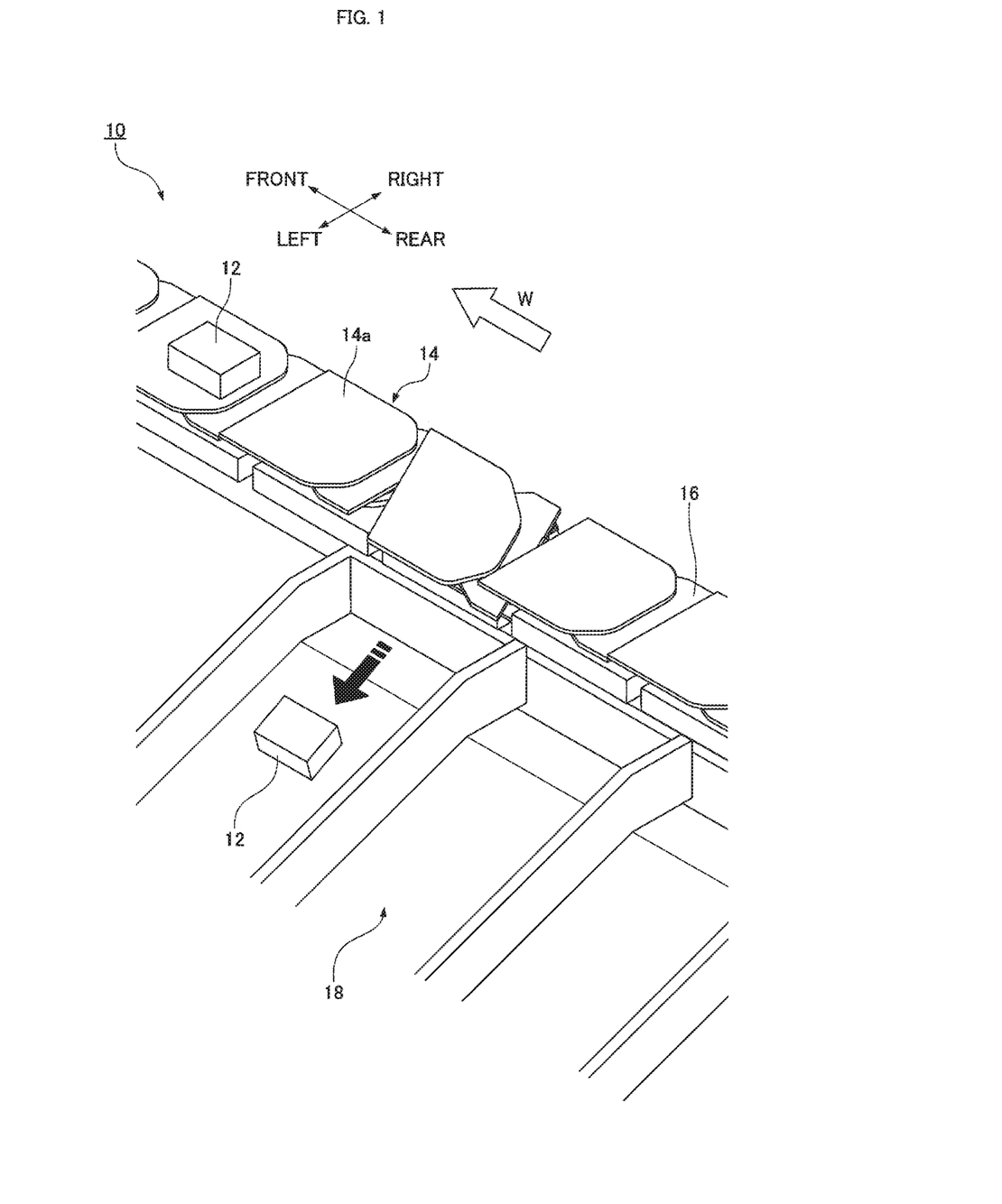
FIG. 1 is a perspective view showing a part of a conveyor apparatus as an example of an embodiment of the present invention.

FIG. 1 shows a part of a conveyor apparatus 10 as an example of an embodiment of the present invention. In the conveyor apparatus 10, an article 12 to be conveyed is placed on a tray 14 serving as an article support and is conveyed in a conveying direction W. As shown in FIG. 1, a plurality of trays 14 are arranged in series along the conveying direction W. Each of the trays 14 can support the article 12 on an article support surface 14a.

As indicated by a virtual line in FIG. 1, the tray 14 can be laterally inclined with respect to the conveying direction W (FIG. 1 only shows a tray 14 inclined to the left). Thus, the article support surface 14a of the tray 14 can be inclined from a horizontal plane so as to discharge the article 12 into one of a plurality of chutes 18 placed along the conveying direction W. The chutes 18 are connected to the respective destinations. The operation of the conveyor apparatus 10 is controlled so as to discharge the article 12 on the tray 14 into the chute 18 connected to the destination of the article 12.

Moreover, an infill plate 16 serving as an infilling member is provided for each of the trays 14 so as to fill a clearance between the two trays 14 longitudinally arranged (adjacent to each other) along the conveying direction W. This configuration prevents a part or the whole of the article 12 from falling into a clearance between the trays 14. The infill plate 16 is inclined with the corresponding tray 14 when the tray 14 is inclined.

Traveling Unit

Figure 2:
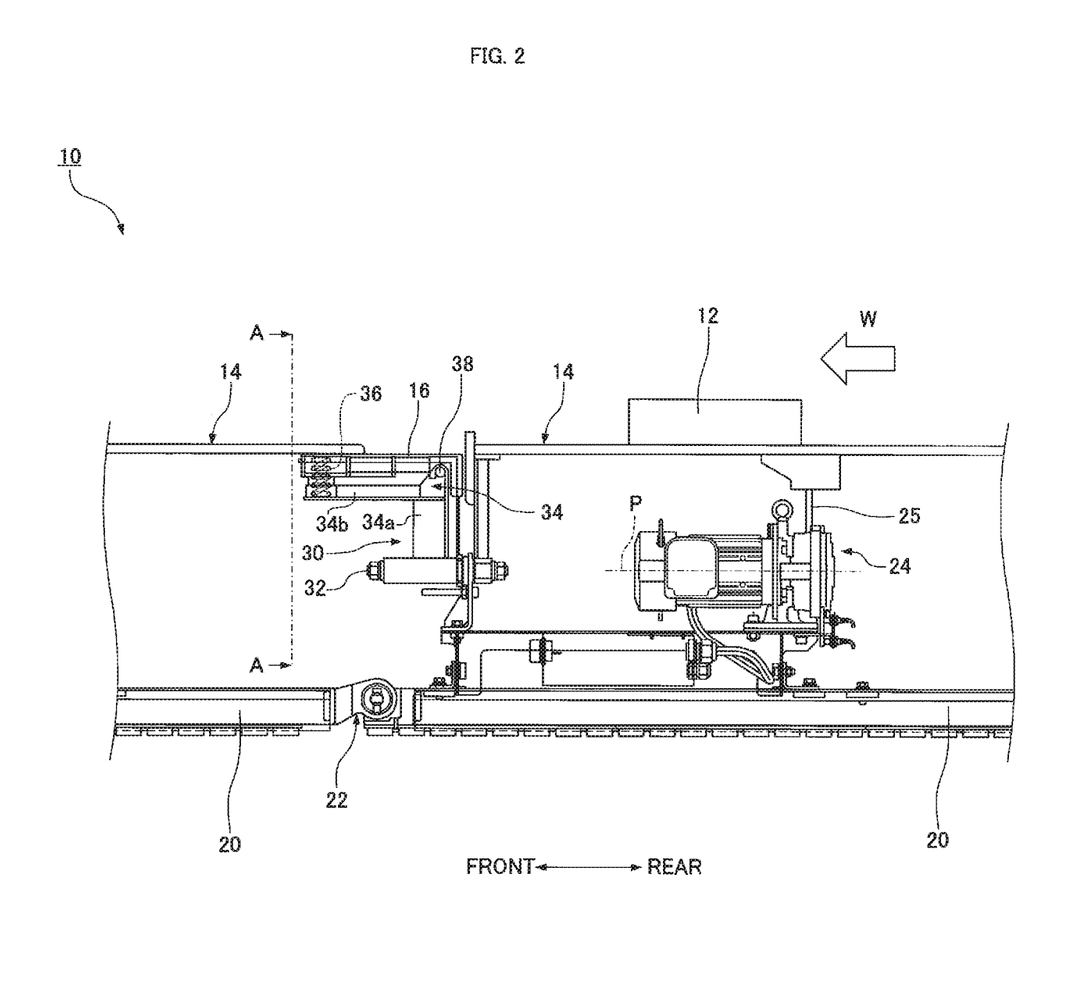
FIG. 2 is a side view showing the conveyor apparatus according to the embodiment.

FIG. 2 is a side view of the conveyor apparatus 10. As shown in FIG. 2, the tray 14 is supported by a traveling unit 20. The traveling unit 20 travels along a rail (not shown in FIG. 2) laid along a conveying path. The entire traveling unit 20 is substantially shaped like a rectangular plate longitudinally extended along the conveying direction W. The traveling units 20 longitudinally arranged (adjacent to each other) along the conveying direction W are connected to each other via a coupler 22. The coupler 22 is not specifically illustrated. The bodies of the connected traveling units 20 can vertically and horizontally pivot about the coupler 22. Thus, even if the traveling units 20 travel along curves or ups and downs in the conveying path, the line of traveling units 20 can travel along the shape of the conveying path.

Moreover, the traveling unit 20 supports the tray 14 via an inclining part 24. The inclining part 24 rotates a tray support member 25, which vertically extends so as to support the tray 14, by a driving force of a motor 26 and the like around an inclination axis P parallel to the conveying direction W, thereby inclining the tray 14 so as to incline the article support surface 14a of the tray 14 from the horizontal plane.

Plate Support Part

Furthermore, a plate support part 30 supporting the infill plate 16 is provided at the front of the traveling unit 20 with respect to the conveying direction W. The plate support part 30 includes a plate inclining shaft 32 (infilling member inclining shaft) supported by the traveling unit 20 and a plate support 34 connected to the plate inclining shaft 32.

The plate inclining shaft 32 is a long member axially extended along the conveying direction W. The plate inclining shaft 32 is extended coaxially with the inclination axis P of the tray 14. Moreover, the plate inclining shaft 32 can rotate about the axial direction. If the infill plate 16 is inclined, the plate support 34 and the plate inclining shaft 32 both rotate along the axial direction of the plate inclining shaft 32 according to the inclination.

The plate support 34 includes a vertical part 34a that is connected to the plate inclining shaft 32 and is vertically extended upward, and front extending parts 34b that extend forward from the vertical part 34a in the conveying direction W. Moreover, a swing bar 38 is supported on the upper end of the vertical part 34a and the rear ends of the front extending parts 34b so as to form a swinging shaft laterally extending with respect to the conveying direction W. Furthermore, springs 36 vertically extending upward are respectively supported on the front sides of the front extending parts 34b. The infill plate 16 is supported from below by the swing bar 38 and the springs 36.

Infill Plate

The infill plate 16 can be made of, for example, injection-molded synthetic resin. As indicated by broken lines in the plan view of FIG. 3, the infill plate 16 supported by the plate support part 30 is as large as the tray 14 in the width direction (a direction crossing the conveying direction W) and is longer than a clearance between the trays 14 in the longitudinal direction along the conveying direction W. The infill plate 16 is longer than the clearance in the longitudinal direction and thus extends from the front end of the rear tray 14 (the tray 14 indicated by a solid line on the right side in FIG. 3) to the bottom of the rear of the front tray 14 (the tray 14 indicated by a virtual line on the left side in FIG. 3), thereby completely filling the clearance in the longitudinal direction.

Figure 3:
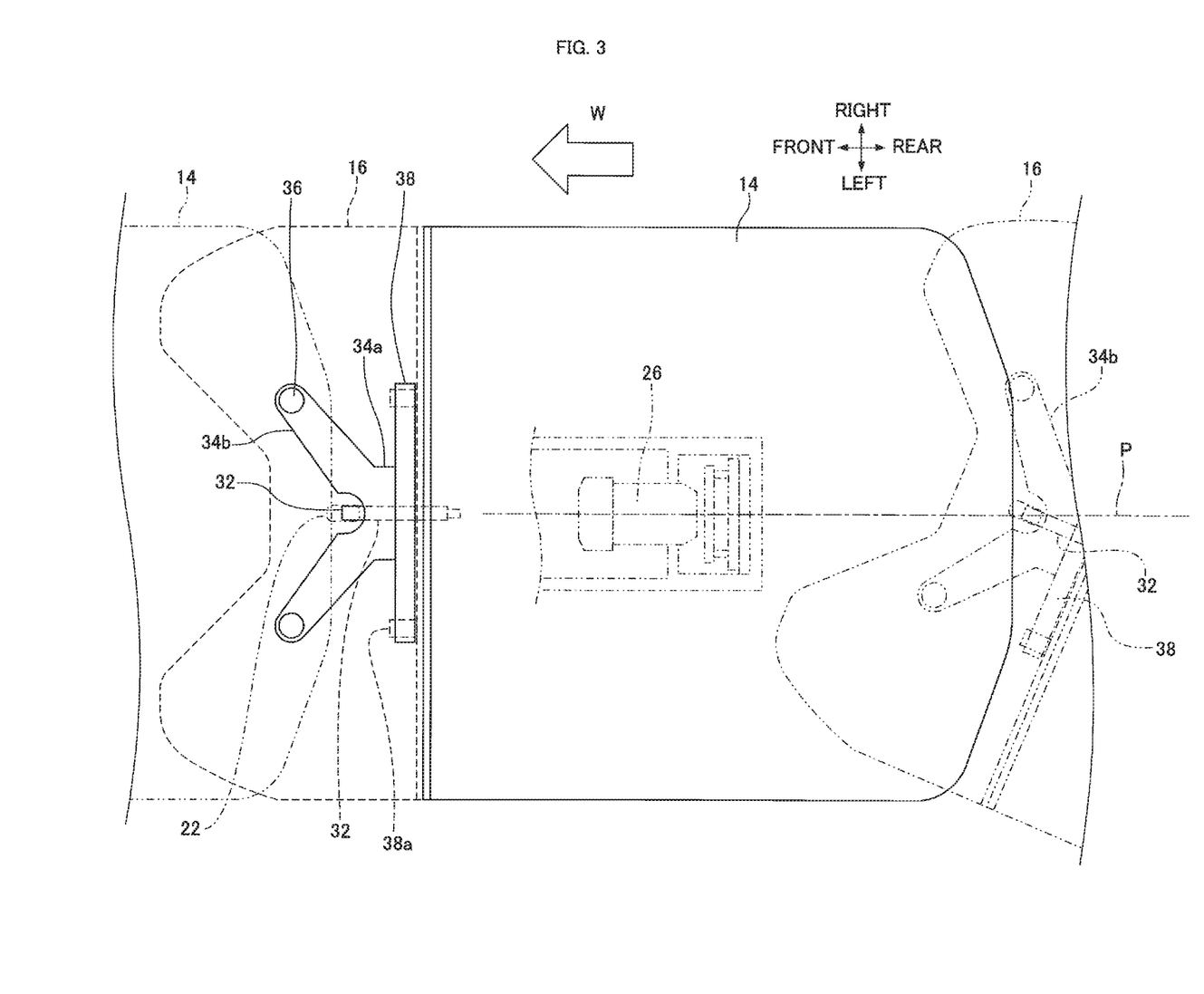
FIG. 3 is a plan view showing a plate support part for the conveyor apparatus according to the embodiment.

When the trays 14 travel on a curve, the traveling directions of the tray 14 and the infill plate 16 intersect each other as indicated on the right end of FIG. 3, so that the vertically overlapping area of the tray 14 and the infill plate 16 is small on one of the right and left sides (the right side in FIG. 3) and is large on the other side (the left side in FIG. 3) unlike when traveling on a linear part. Also in this case, in order to completely close the clearance, the right and left parts of the infill plate 16 in the width direction have larger longitudinal dimensions than the center of the infill plate 16 in the width direction.

Figure 4:
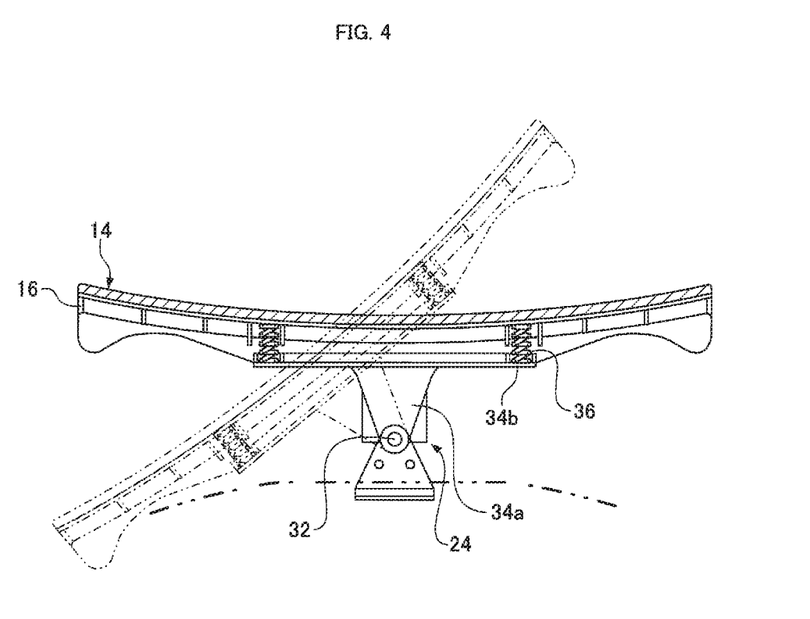
FIG. 4 is a cross-sectional view showing an infill plate and a tray for the conveyor apparatus according to the embodiment, taken along line A-A of FIG. 2.

As shown in FIG. 4 which is a cross-sectional view taken along line A-A of FIG. 2 and a perspective view in FIG. 5, the bottom of the front side of the infill plate 16 is supported from below by the springs 36. Moreover, a bar fitting part 38a, e.g., a groove or a hole sized to be fit to the swing bar 38 is provided below the rear side of the infill plate 16 (in this configuration, the bar fitting part 38a is a hole). As has been discussed, the swing bar 38 fit into the bar fitting part 38a is supported by the plate support part 30. The infill plate 16 can vertically swing around the axis of the swing bar 38.

Spring

Figure 5:
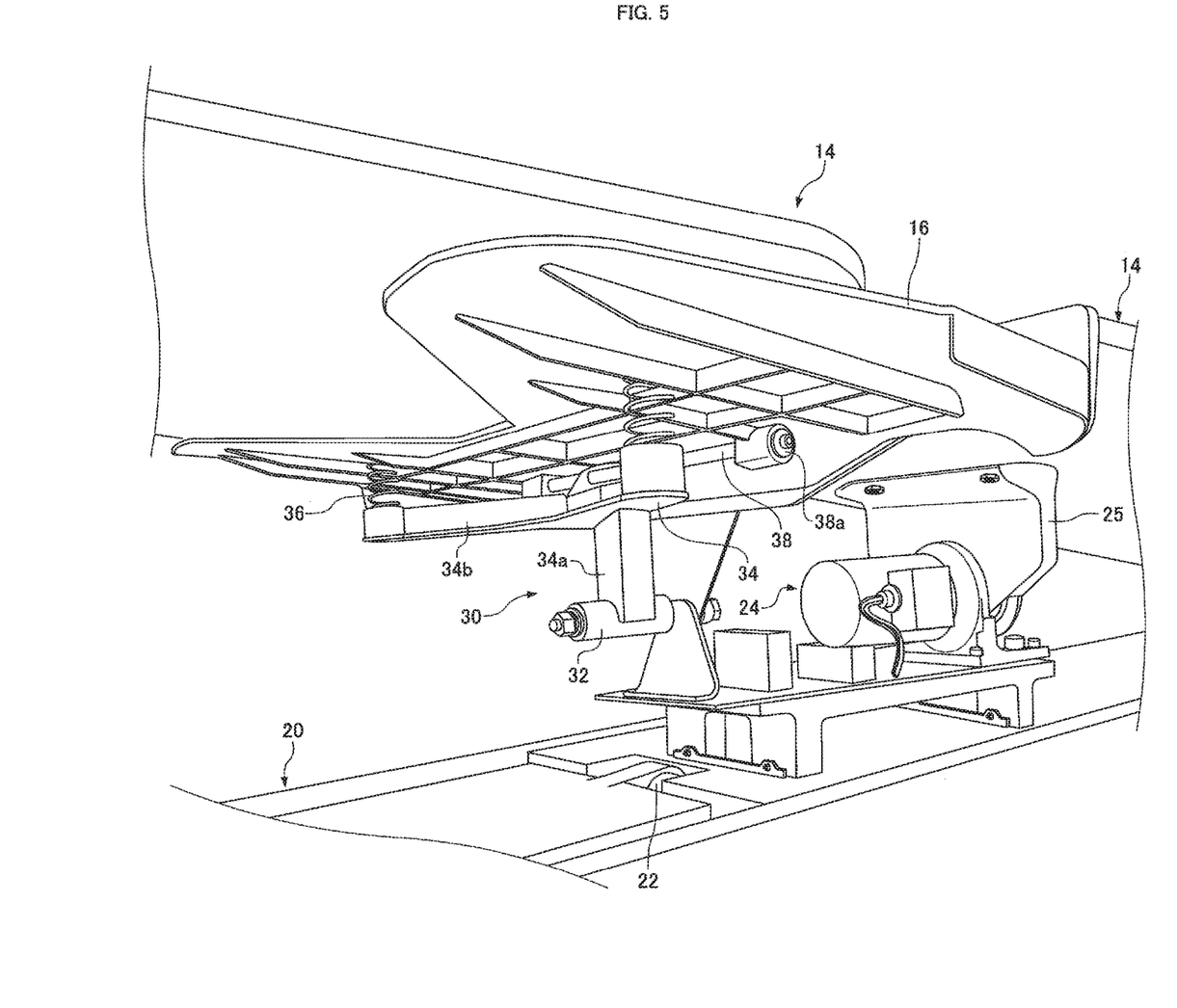
FIG. 5 is a perspective bottom view showing a state around a traveling unit for the conveyor apparatus according to the embodiment.

As shown in FIGS. 3 and 5, the front extending parts 34b of the plate support 34 are branches extending forward to the right and left. The two branch front extending parts 34b support the respective springs 36 on the front ends. Thus, the two springs 36 are respectively disposed at two points separated in the width direction under the infill plate 16 and support the front part of the infill plate 16.

When the spring 36 acting as a restoring force member is extended or compressed (displaced) from a length in a state of equilibrium (an external force is not applied), the spring 36 generates a force for restoration to the state of equilibrium, that is, a restoring force by the elasticity of the spring 36. The spring 36 in the state of equilibrium is designed to be longer than a distance from a position where the plate support part 30 in FIG. 2 supports the spring (specifically, the top surface of the front extending part 34b of the plate support 34) to the bottom of the tray 14. Thus, the spring 16 is more compressed than in the state of equilibrium, extending upward to the tray 14. The spring 16 extending upward presses upward the infill plate 36 disposed between the plate support part 30 and the tray 14. This urges the infill plate 16 to the front tray 14 that is an article support corresponding to the infill plate 16.

The infill plate 16 is urged to the tray 14 and thus follows the movement of the tray 14. For example, as indicated by virtual lines in FIG. 4, when the tray 14 laterally inclines (to the left in FIG. 4, that is, to the right with respect to the traveling direction), a part of the tray 14 moves down from the horizontal plane (the left side in FIG. 4) so as to press down the infill plate 16, whereas a part of the tray 14 moves up from the horizontal plane (the right side in FIG. 4) so as to separate upward from the infill plate 16. The infill plate 16 is urged to the tray 14 by the elastic force of the spring 36 on the right side in FIG. 4, allowing the infill plate 16 to follow the tray 14 and incline, being in contact with the tray 14 according to the movement of the tray 14 that is supposed to separate from the infill plate 16. Thus, even if the tray 14 is inclined, a constant distance is kept between the infill plate 16 and the tray 14 over the lateral direction as before the inclination. In other words, the infill plate 16 and the tray 14 are kept in contact with each other over the width direction, thereby leaving no clearance between the infill plate 16 and the tray 14. Similarly, even if the traveling unit 20 and the tray 14 travel on a curve in the conveying path, the springs 36 always urge the infill plate 16 to the tray 14, thereby leaving no clearance between the infill plate 16 and the tray 14.

As has been discussed, in the conveyor apparatus 10 of the present embodiment, the infill plate 16 as an infilling member is urged to the tray 14 acting as an article support by the springs 36 acting as restoring force members, thereby keeping the infill plate 16 in contact with the tray 14 without leaving any clearance regardless of the orientation and the traveling status of the tray 14 (whether the tray 14 is inclined or not or whether the tray 14 is running on a curve). This can prevent the article 12 from falling into a clearance between the trays 14 adjacent to each other in the longitudinal direction.

Furthermore, the spring 36 urges the infill plate 16 from below, thereby stably supporting the weight of the article 12 even if placed on the infill plate 16.

Moreover, the infill plate 16 is urged by the two springs 36 disposed at two positions separated in the width direction, and thus the infill plate 16 is stably supported in the width direction. An urging force received by the infill plate 16 from the spring 36 is maximized at a position where the spring 36 and the infill plate 16 are in contact with each other, and the urging force decreases with increasing distance from the position. Since the springs 36 are disposed at positions separated in the width direction, a total force received by the infill plate 16 from the springs 36 is substantially equal at any point of the infill plate 16, thereby preventing a large load from being applied only to a specific point of the infill plate 16. In other words, an uneven urging force is not applied in the width direction of the infill plate 16. Thus, the infill plate 16 is not unevenly deformed in the width direction by a force from the springs 36.

For example, when the left side of the infill plate 16 separates downward from the tray 14, the spring 36 on the left side is compressed downward, thereby increasing an elastic force produced by the spring 36 on the left side that presses back the tray 14 upward. Thus, the left side of the infill plate 16 is strongly urged to the tray 14 by the elastic force of the spring 36 on the left side and thus is not separated from the tray 14. The spring 36 on the right side is not compressed at this point, so that a force applied to the right side of the infill plate 16 is not increased. The multiple springs 36 are provided so as to press back the infill plate 16 to the tray 14 only at a point separating from the tray 14 but do not increase forces at other points on the infill plate 16. Thus, the entire infill plate 16 is always in contact with the tray 14 and is kept in a stably supported state without receiving an excessive load.

As shown in FIGS. 2 and 5, the traveling unit 20 is caused to travel while supporting the tray 14, and the traveling unit 20 supports the infill plate 16. However if only looking at one of the traveling unit 20, the tray 14 where the infill plate 16 supported by the traveling unit 20 (the tray 14 corresponding to the infill plate 16) is urged by the springs 36 is different from the tray 14 caused to travel by the traveling unit 20. Specifically, the tray 14 corresponding to the infill plate 16 travels in front of the tray 14 (next to the tray 14 in the conveying path) caused to travel by the traveling unit 20 supporting the infill plate 16.

Thus, the infill plate 16 can fill the clearance between the front tray 14 and the rear tray 14 according to the orientation of the rear tray 14. For example, as indicated on the right side of FIG. 3, if the front tray 14 and the rear tray 14 travel in a nonlinear manner (cross each other) on a curve or the like, the orientation of the front tray 14 is different from that of the rear tray 14 in plan view. However, the infill plate 16 travels with the rear tray 14 (the traveling unit 20 supporting the rear tray 14) and thus does not separate from the rear tray 14. As has been discussed, the infill plate 16 longitudinally has a large size and thus is disposed so as to extend to the front side of the rear tray 14. Thus, as indicated on the right side of FIG. 3, even if the adjacent trays 14 travel in different manners, for example, the orientation of the front tray 14 is different from that of the rear tray 14 in plan view, the infill plate 16 always extends from the front side of the rear tray 14 to the rear side of the front tray 14, so that the infill plate 16 can securely fill the clearance between the trays 14 regardless of the traveling statuses of the trays 14.

Moreover, as shown in FIG. 2, the infill plate 16 is supported by the plate support 34 that is connected to the plate inclining shaft 32. Thus, when the infill plate 16 is inclined according to the inclination of the tray 14, the infill plate 16 inclines around the axis of the plate inclining shaft 32. In this case, when the trays 14 travel on a linear part of the traveling path, the direction of extension (axial direction) of the plate inclining shaft 32 is coaxial with the inclination axis P of the tray 14. Thus, the central axes of inclination of the infill plate 16 and inclination of the tray 14 are coaxial with each other. Thus, as indicated by the virtual lines in FIG. 4, the infill plate 16 inclines along the same path (drawing a concentric circle) as the inclination of the tray 14. This sufficiently inclines the infill plate 16 along with the inclination of the tray 14 without excessively separating the infill plate 16 from the tray 14.

If the trays 14 travel on a curve of the traveling path, an angle is formed between the traveling direction of the front tray 14 and the traveling direction of the rear tray 14 according to the curvature of the curve. Thus, the inclination axis P of the front tray 14 and the axis of the plate inclining shaft 32 behind the front tray 14 are not coaxial with each other but are extended in different directions. Also in this case, however, the infill plate 16 behind the front tray 14 is urged to the corresponding (front) tray 14. Hence, even when the tray 14 is inclined at a curve, the force of inclination (a force generated by the inclining part 24) is transmitted to the infill plate 16 through the springs 36. Thus, when the tray 14 inclines at a curve, the infill plate 16 does not move coaxially with the tray 14 but laterally inclines at the same angle as the tray 14, so that the infill plate 16 can incline in contact with the tray 14 according to the inclination of the tray 14.

When the tray 14 inclines at a curve, the infill plate 16 does not move coaxially with the tray 14, thereby applying different forces to the right and left sides of the infill plate 16 in the width direction from the tray 14. As a specific example, in the case of inclination to the left at a left curve with respect to the traveling direction (inclination to the inside of the curve), the left side of the tray 14 moves downward so as to strongly press the infill plate 16, whereas the right side of the tray 14 moves upward so as to slightly separate from the infill plate 16. As has been discussed, the tray 14 applies different forces to the right and left sides of the infill plate 16 in the width direction. The forces from the tray 14 are transmitted to the infill plate 16 through the springs 36 and thus a difference in force between the right and left sides is absorbed by the elasticity of the springs 36. In other words, the left spring 36 is considerably compressed, whereas the right spring is slightly stretched from a horizontal state of the tray 14. If the infill plate 16 (cover member) is directly connected to the tray 14 (article support member) as in the related art, the infill plate 16 cannot be largely separated from the tray 14. Thus, if considerably different forces are applied to the right and left in the width direction, the infill plate 16 cannot be deformed so as to absorb the force difference. This may break the infill plate 16 in a twisting manner. In the present embodiment, a difference in force between the right and left sides does not act to twist the tray 14 but to vary amounts of extension and compression between the right and left springs 36. In other words, in the present embodiment, the infill plate 16 is not directly connected to the tray 14 and thus can vary amounts of compression or amounts of extension (amounts of extension and compression) of the springs 36 between the right and left sides according to a force difference between the right and left sides. Thus, during inclination at a curve in the present embodiment, a difference in force between the right and left sides of the infill plate 16 can be absorbed as a difference in the amount of extension and compression of the springs 36, preventing damage to the infill plate 16.

Moreover, as shown in FIGS. 2 and 5, the swing bar 38 is attached to the infill plate 16. Thus, when a force is vertically applied to the infill plate 16, the infill plate 16 vertically swings around the axis of the swing bar 38. Hence, if the tray 14 entirely moves in the vertical direction and the infill plate 16 follows the vertical movement, the infill plate 16 does not entirely move in the vertical direction but swings around the swing bar 38. For example, if the conveying path of the tray 14 includes height differences, e.g., an uphill or a downhill, the tray 14 passing through the height differences entirely moves in the vertical direction. At this point, the front side of the infill plate 16 is in contact with the tray 14 so as to vertically move according to the vertical movement of the tray 14. In some cases, a distance between the front side of the infill plate 16 and the traveling unit 20 changes but a distance remains constant between the traveling unit 20 and the rear side of the infill plate 16, that is, at a point where the swing bar 38 is attached. Thus, for example, when the front tray 14 on a downhill moves below the rear tray 14, the front side of the infill plate 16 moves downward according to the movement of the front tray 14 and the rear side of the infill plate 16 is kept at the same height as the rear tray 14. If the infill plate 16 entirely moves downward in the longitudinal direction according to the movement of the front tray 14, a clearance may be vertically formed between the infill plate 16 and the rear tray 14. Such a clearance is not left as long as the rear side of the infill plate 16 is kept at the same height as the rear tray 14. In this way, the infill plate 16 vertically swings around the swing bar 38, thereby preventing a clearance from being left between the infill plate 16 and the tray 14 during the vertical movement of the tray 14.

As has been discussed, according to the conveyor apparatus 10 of the present embodiment, the infill plate 16 sufficiently follows the movement of the tray 14 and thus a clearance is not left between the infill plate 16 and the tray 14 when the tray 14 is inclined or vertically moved.

In the present embodiment, the infill plate 16 sufficiently follows various states of movements of the tray 14. Thus, the tray 14 can be inclined even at a position where the infill plate 16 cannot sufficiently follow the inclination of the tray 14 and the conveyed article 12 may partially fall between the front and rear trays 14 in the related art, e.g., a curve or ups and downs on a traveling path. Hence, the chutes 18 shown in FIG. 1 can be placed at various positions in the traveling path of the trays 14. This can increase the flexibility of the layout of the conveyor apparatus 10. Since the chutes 18 can be disposed at various positions, a larger number of chutes 18 can be connected to destinations. In other words, the conveyor apparatus 10 can process the articles 12 conveyed to a larger number of destinations.

In the present embodiment, as shown in FIG. 3, the two springs 36 are provided in the width direction. Three or more springs may be provided according to the sizes and shapes of the tray 14 and the infill plate 16. If the tray 14 and the infill plate 16 are extremely large in size, a load may be unevenly applied to the overall infill plate 16 by the elastic force of the two springs 36. The load can be evenly applied to the overall infill plate 16 by increasing the number of springs 36. If the tray 14 and the infill plate 16 are small in size, a load applied to the overall infill plate 16 is not so uneven even in the case of the single spring 36. Thus, the number of components may be reduced by placing the single spring 36, for example, under the center of the infill plate 16 in the width direction.

Furthermore, in the present embodiment, the springs 36 shown in FIG. 5 are used as urging members for urging the infill plate 16 to the tray 14. Any member may be used as long as the infill plate 16 is always pressed to the tray 14. For example, the spring 36 may be replaced with a restoring force member, e.g., a rubber cylinder or an air cylinder. The restoring force member generates a restoring force for restoration to a state of equilibrium according to a displacement from a state where an external force is not applied (a state of equilibrium). Even if a restoring force member other than the spring 36 is used, the restoring force member is disposed so as to apply a restoring force in a direction that presses the infill plate 16 to the tray 14, allowing the infill plate 16 to follow the movement of the tray 14.

In the present embodiment, as shown in FIG. 2, the plate inclining shaft 32 is disposed coaxially with the inclination axis P of the tray 14. The lateral inclination axis of the infill plate 16 does not need to be perfectly coaxial with the inclination axis P of the tray 14 as long as the infill plate 16 can incline according to the inclination of the tray 14 without leaving a clearance between the infill plate 16 and the tray 14. For example, even if the plate inclining shaft 32 is disposed in parallel with the inclination axis P of the tray 14 and above or below the inclination axis P, the infill plate 16 can laterally incline according to the inclination of the tray 14.

In the present embodiment, as shown in FIGS. 2 and 5, the infill plate 16 vertically swings around the swing bar 38. If the conveying path is completely flat and the tray 14 does not largely move up or down, the infill plate 16 may be supported only by the springs 36 so as to entirely move up and down according to the movement of the tray 14.

In the present embodiment, as shown in FIGS. 2 and 5, the infill plate 16 is urged to the tray 14 by the springs 36 disposed under the infill plate 16. Instead of the provision of the springs 36, the infill plate 16 may be made of an elastic material, e.g., rubber so as to be urged to the tray 14 by the elasticity of the infill plate 16. With this configuration, the infill plate 16 can be urged to the tray 14 without the springs 36. This eliminates the need for preparing the springs 36 and reduces the number of kinds of components constituting the conveyor apparatus 10. Thus, the cost of component acquisition can be lowered and the number of spare parts to be kept for maintenance can be reduced. Moreover, the springs 36 do not need to be disposed and thus the process of assembly of the conveyor apparatus 10 can be simplified. This can reduce the initial cost of constructing the conveyor apparatus 10 and the maintenance cost. In this case, the front part of the infill plate 16 may be disposed above the tray 14 so as to press the infill plate 16 to the tray 14 from the above of the tray 14. As long as the infill plate 16 is pressed by the elasticity of the infill plate 16, urging members such as the springs 36 do not need to be placed around the infill plate 16. Hence, even if the infill plate 16 is disposed over the tray 14, the placement of an article on the tray 14 is not hampered by members other than the infill plate 16.

REFERENCE SIGNS LIST 10 conveyor apparatus
14 tray
16 infill plate
20 traveling unit
22 coupler
24 inclining part
36 spring
38 swing bar Having described the invention, the following is claimed:

1. A conveyor apparatus for conveying articles, comprising:
a plurality of traveling units that travel in series along a conveying path for the articles;
a plurality of article supports that have article support surfaces for supporting the articles and that are caused to travel on the conveying path by the respective traveling units;
infilling members provided for the respective article supports, each infilling member filling a clearance between the article supports longitudinally adjacent to each other in the conveying path,
the infilling member being urged to the corresponding article support so as to be kept in contact with the article support; and
a vertical swinging shaft attached to each of the infilling members, the vertical swinging shaft laterally extending with respect to a conveying direction, and the infilling member is capable of vertically swinging around the vertical swinging shaft.

2. The conveyor apparatus according to claim 1, further comprising restoring force members provided for the respective infilling members so as to generate a restoring force according to a displacement from a state of equilibrium, wherein the infilling member is urged from below of the article support by the restoring force generated by the restoring force member.

3. The conveyor apparatus according to claim 2, wherein the plurality of restoring force members are provided for each of the infilling members, and at least two of the plurality of the restoring force members are disposed at separate positions in a direction crossing the conveying path.

4. The conveyor apparatus according to claim 1, wherein the infilling member is made of an elastic material, and the infilling member is urged to the article support by elasticity of the infilling member.

5. The conveyor apparatus according to claim 1, wherein the infilling member is supported by the traveling unit that causes the article support to travel next to the corresponding article support of the infilling member in the conveying path.

6. The conveyor apparatus according to claim 5, wherein each of the traveling units includes an inclining unit capable of inclining the article support surface in a lateral direction of the conveying path from a horizontal plane by inclining, around a support inclination axis extending along the conveying path, the article support caused to travel by the traveling unit, and the infilling member supported by the traveling unit is pivotally supported so as to freely incline around an infilling member inclination axis extending coaxially with the support inclination axis.

* * * * *